C. B. MOREHOUSE.

Whip Socket.

No. 4,071.

Reissued July 12, 1870.

Witnesses:

L. Lynchs

C. Bodf

Inventor:

Charles B. Morehouse

By his Atty

J. Franklin Regart.

N. PETERS, Photo-Lithographer, Washington, D. C.

United States Patent Office.

JOHN O. MERRIAM AND EDWIN CHAMBERLIN, OF TROY, NEW YORK, ASSIGNEES OF CHARLES B. MOREHOUSE.

*Letters Patent No. 52,439, dated February 6, 1866; reissue No. 4,071, dated July 12, 1870.*

IMPROVEMENT IN WHIP-SOCKETS.

The Schedule referred to in these Letters Patent and making part of the same.

*To all whom it may concern:*

Be it known that Letters Patent of the United States of America were duly granted and issued to CHARLES B. MOREHOUSE, of New Castle, Henry county, Indiana, on the 6th day of February, 1866, upon "Improvement in Whip-Sockets," which Letters Patent were afterward, to wit, on the 7th day of June, 1869, duly assigned to your petitioners, JOHN O. MERRIAM and EDWIN CHAMBERLIN, both residing at Troy, New York, and which said assignment was duly recorded in the United States Patent Office as by law required. And your petitioners beg leave to hereby surrender the said Letters Patent, as, by reason of a defective and insufficient specification, they are wholly inoperative and invalid, and would most respectfully ask that new Letters Patent may be ordered to issue to your petitioners as the sole assignees of said MOREHOUSE, upon the following corrected and amended specification, and they beg leave to refer to the drawing accompanying the original application of said MOREHOUSE, which is hereby made a part of this specification.

Like letters represent and refer to like or corresponding parts.

The nature of the said invention and improvement consists in the use of a whip-socket, having permanently attached thereto a suitably shaped extension or extensions, adapted to fit the dash-board rod of a carriage or other vehicle, in combination with one or more screw-caps, whereby said whip-socket may be securely fastened to the dash-board rod, substantially in the manner and for the purposes hereinafter more fully described and specified.

Figure 1:
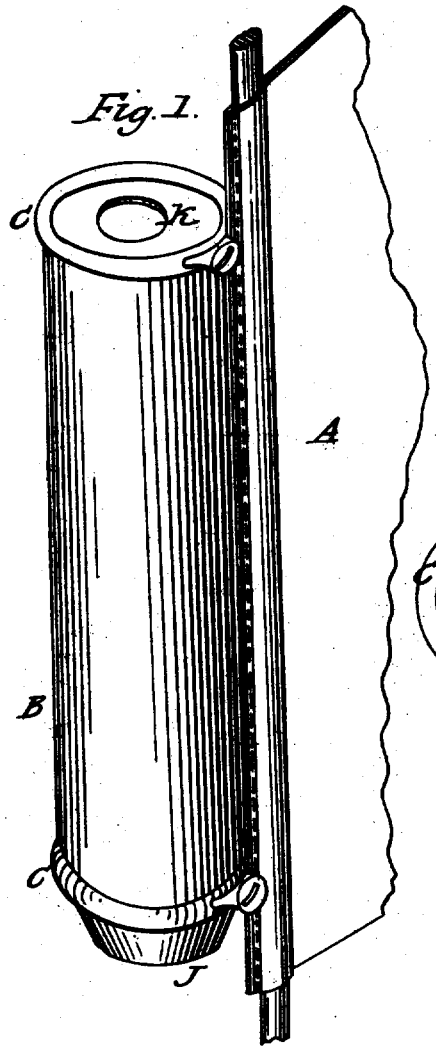
Figure 1 is a perspective view of a whip-socket and dash-board of a carriage or other vehicle, said whip-socket being attached and connected to said dash-board by means of an improved fastening, more fully hereinafter described.
Figure 2:
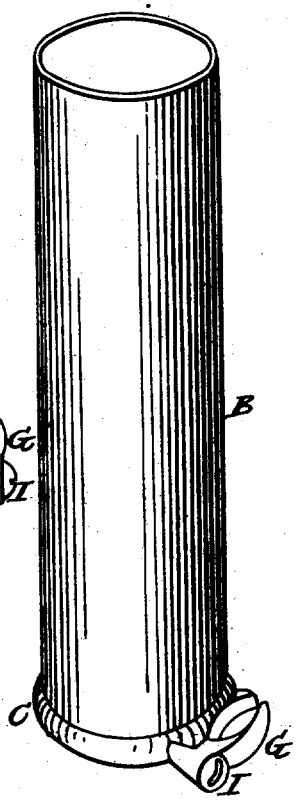
Figure 2 shows the whip-socket and fastening detached from the dash-board.

To enable others skilled in the art to which the invention relates to make and use the same, we will here proceed to describe the construction and operation thereof, which is as follows, to wit:

The whip-socket B, figs. 1 and 2, may be made in any usual shape, and of any material desired, having at the top and bottom thereof metal rings or flanges, D, which are for the purpose of supporting and strengthening the whip-socket B, and form a part thereof.

Figure 3:
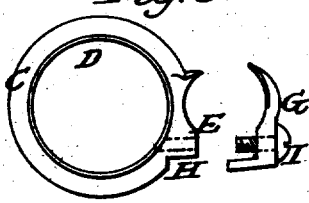
Figure 3 is an enlarged perspective view of the improved fastening, clearly showing the construction and operation thereof, each being fully described hereinafter.

To these rings or flanges D are securely and permanently attached the stationary clamps E, fig. 3.

These clamps E should be of proper shape and size, to conform to the dash-rod K, fig. 1.

The clamp G, fig. 3, is made of malleable cast-iron, or other metal, and in size and shape to correspond with the stationary clamp E.

The operation of the improved fastening is as follows:

The whip-socket B is placed against the dash-board A, the stationary clamps E fitting closely against the dash-board rod K. The clamp G is then placed against the said dash-rod K, opposite to the stationary clamp E, and then, by means of a screw or screws, or other mechanical means, the said clamps are forced together, securely clamping, clasping, and grasping the dash-board rod K, thereby securely holding and fastening the whip-socket B in its proper place and position, yet detachable at pleasure.

Having thus described the nature of the said invention,

What we claim as new and desire to secure by Letters Patent of the United States, is—

The whip-socket B, having permanently attached thereto the stationary jaw or clamp E, in combination with the detachable jaw or clamp G, whereby the said whip-socket may be fastened to and connected with the dash-board rod of a carriage or other vehicle, substantially in the manner and by the means herein described and set forth.

In testimony whereof we have hereto set our hands this 5th day of May, A. D. 1870.

CHARLES B. MOREHOUSE,
JOHN O. MERRIAM,
EDWIN CHAMBERLIN,
*Inventor, by*
*Assignees.*

Witnesses:
C. D. KELLUM,
E. CHAMBERLIN, Jr.